(12) United States Patent
Fujimura et al.

(10) Patent No.: US 8,142,081 B2
(45) Date of Patent: Mar. 27, 2012

(54) WHEEL SUPPORT BEARING ASSEMBLY

(75) Inventors: Akira Fujimura, Iwata (JP); Kazuo Komori, Iwata (JP); Kazunori Kubota, Iwata (JP); Tetsuya Hashimoto, Iwata (JP)

(73) Assignee: NTN Corporation, Osaka (JP)

( * ) Notice: Subject to any disclaimer, the term of this patent is extended or adjusted under 35 U.S.C. 154(b) by 516 days.

(21) Appl. No.: 12/309,973

(22) PCT Filed: Aug. 7, 2007

(86) PCT No.: PCT/JP2007/000849
§ 371 (c)(1),
(2), (4) Date: Feb. 5, 2009

(87) PCT Pub. No.: WO2008/018175
PCT Pub. Date: Feb. 14, 2008

(65) Prior Publication Data
US 2009/0268998 A1  Oct. 29, 2009

(30) Foreign Application Priority Data
Aug. 8, 2006  (JP) .................. 2006-215860

(51) Int. Cl.
*F16C 13/00* (2006.01)
*F16C 43/04* (2006.01)

(52) U.S. Cl. .......... 384/537; 384/544; 384/589

(58) Field of Classification Search .......... 384/448, 384/489, 504, 537, 543–544, 548, 613, 625, 384/589
See application file for complete search history.

(56) References Cited

U.S. PATENT DOCUMENTS

| | | | | |
|---|---|---|---|---|
| 4,887,917 A * | 12/1989 | Troster et al. | ............... | 384/543 |
| 6,280,096 B1 * | 8/2001 | Miyazaki et al. | ........... | 384/544 |
| 6,485,187 B1 * | 11/2002 | Meeker et al. | ............... | 384/537 |
| 6,497,515 B1 | 12/2002 | Sahashi et al. | | |
| 6,574,865 B2 * | 6/2003 | Meeker et al. | ............... | 384/544 |
| 6,702,472 B2 * | 3/2004 | Sera et al. | .................. | 384/489 |
| 6,715,926 B2 * | 4/2004 | Tajima et al. | ................ | 384/544 |
| 6,879,149 B2 * | 4/2005 | Okada et al. | ................ | 384/448 |

(Continued)

FOREIGN PATENT DOCUMENTS
JP  9-164803  6/1997

(Continued)

OTHER PUBLICATIONS
Japanese Office Action issued Mar. 9, 2010 in corresponding Japanese Patent Application 2006-215860.

(Continued)

*Primary Examiner* — Marcus Charles

(57) ABSTRACT

A wheel support bearing assembly includes an outer member, an inner member and double row balls. The inner member includes a hub unit, which has a wheel mounting flange defined in an outer periphery thereof, and an inner ring mounted on the outer periphery of the inboard end of the hub unit. A shoulder is provided in an inner peripheral edge of the inboard end face of the inner ring. A crimped portion, engageable with a stepped face of the shoulder, is provided in the inboard end of the hub unit by diameter expansion. The crimped portion is formed by crimping such diameter expanded portion which is thin walled by providing a hub inner diameter setback in the inner periphery of the inboard end of the hub unit. This thin walled portion is positioned on a side inboardly of the straight line defining a ball contact angle in the inboard raceway surface.

8 Claims, 3 Drawing Sheets

U.S. PATENT DOCUMENTS

| | | | |
|---|---|---|---|
| 2002/0033638 A1 | 3/2002 | Okada et al. | |
| 2002/0110300 A1 | 8/2002 | Meeker et al. | |
| 2002/0130655 A1 | 9/2002 | Okada et al. | |
| 2003/0081872 A1 | 5/2003 | Sahashi et al. | |
| 2004/0120622 A1 | 6/2004 | Tajima et al. | |
| 2006/0274986 A1* | 12/2006 | Komori et al. | 384/544 |
| 2008/0089628 A1 | 4/2008 | Kiuchi et al. | |

FOREIGN PATENT DOCUMENTS

| | | | |
|---|---|---|---|
| JP | 2001-1710 | | 1/2001 |
| JP | 2002/283804 | | 10/2002 |
| JP | 2002-372548 | | 12/2002 |
| JP | 2003-042173 | | 2/2003 |
| JP | 2005042914 A | * | 2/2005 |
| JP | 2005-138653 | | 6/2005 |
| JP | 2007024132 A | * | 2/2007 |
| WO | 2006/040897 A1 | | 4/2006 |

OTHER PUBLICATIONS

Japanese Office Action issued on Jun. 29, 2010 in corresponding Japanese Patent Application 2006-215860.

Chinese Office Action mailed Jun. 7, 2010 in corresponding Chinese Patent Application 200780029347.7.

International Preliminary Report on Patentability issued on Feb. 19, 2009 in corresponding International Patent Application PCT/JP2007/000849.

International Search Report for PCT/JP2007/000849, mailed Nov. 20, 2007.

Chinese Office Action dated Jun. 29, 2011, issued in corresponding Chinese Patent Application No. 200780029347.7.

* cited by examiner

PRIOR ART

PRIOR ART

WHEEL SUPPORT BEARING ASSEMBLY

CROSS REFERENCE TO RELATED APPLICATIONS

This application claims the benefit under 35 U.S.C. Section 371, of PCT International Application Number PCT/JP2007/000849, filed Aug. 7, 2007 and Japanese Application No. 2006-215860, filed Aug. 8, 2006 in Japan, the contents of which are incorporated herein by reference.

BACKGROUND OF THE INVENTION

1. Field of the Invention

The present invention relates to a wheel support bearing assembly for rotatably supporting a vehicle wheel or the like.

2. Description of the Prior Art

As a wheel support bearing assembly for supporting a vehicle drive wheel, such a wheel support bearing assembly as shown in FIG. 3 of the accompanying drawings has hitherto been suggested (See, for example, the Japanese Laid-open Patent Publication No. H9-164803). Referring to FIG. 3, the wheel support bearing assembly shown therein is of a type, in which double row balls 25 as rolling elements are interposed between raceway surfaces 23 and 24, opposed to each other, defined respectively in an outer member 21 and an inner member 22. The inner member 22 is made up of a hub unit 28, having a wheel mounting hub flange 29a defined in an outer periphery thereof, and an inner ring 30 mounted on an outer periphery of an inboard end of the hub unit 29. The hub unit 29 has a center bore 31 defined in a center portion thereof, into which a stem portion 33a of an outer ring 33 of a constant velocity universal joint, and a stepped face 33b of the constant velocity universal joint outer ring 33 is urged against an inboard end face 30a of the inner ring 30. In this condition, with a nut 34 threadingly mounted on a free end of the stem portion 33a, the inner member 22 is constrained axially in position by and between the constant velocity universal joint outer ring 33 and the nut 34.

In this suggested example, the inner ring 30 is externally mounted on an inner ring mounting area 35, which is defined in the outer periphery of the inboard end of the hub unit 28 and is so configured as to represent an annular recess, a step 36 is formed in an inner periphery of an inboard end of the inner ring 30, and the inboard end of the hub unit 29 is radially outwardly deformed by diameter expansion to crimp the step 36 in the inner ring 30. In this way, an undesirable separation of the inner ring 30, which would occur by the effect of an external force during assemblage onto an automotive vehicle body, is avoided.

It is, however, been found that the wheel support bearing assembly of the type discussed above has the following problems:

(1) Since a crimped portion 29b of the hub unit 29 is large in size, as shown in FIG. 4 showing a portion of FIG. 3 on an enlarged scale, the radial setback of the step 36 formed in the inboard end portion of the inner ring 30 must be about 5 to 7 mm in terms of the difference in radius between the inner ring mounting area 35 and the step 36. If the setback of the step 36 is increased, the surface area of the inboard end face 30a of the inner ring 30 will decrease and as a result, the surface pressure of contact with the stepped face 33b of the constant velocity universal joint outer ring 33 will hence increase. For this reason, it will constitute a cause of generation of frictional wear and abnormal noise.

(2) If an attempt is made to allow the crimped portion 29b of the hub unit 29 to be accommodated inwardly (outboardly) of the inboard end of the inner ring 30, it is necessary that the axial length of the step 36 in the inner ring 30 as shown in FIG. 4 must be 7 to 8 mm. Such an increase of the axial length of the step 36 results in a tendency of the inner ring step 36 to be positioned on an extended line L of the ball contact angle θ and there is the possibility of considerable deformation of the inner ring by the effect of a load bearing during the operation, resulting in reduction in lifetime. Also, such an increase of the axial length of the inner ring step 36 results in decrease of the mounting length (surface area), over which the inner ring 30 is mounted on the hub unit 29, and, therefore, an inner ring creepage may occur, resulting in the possibility of the bearing lifetime being reduced. Those problems may be alleviated if the widthwise dimension (the axial length) of the inner ring 30 as a whole is increased, but increase of the widthwise dimension would require an extra space the widthwise direction.

(3) In addition, since the crimped portion 29b of the hub unit 29 is large in size, a crimping punch will interfere with the inner ring 30 during the orbital forging process, resulting in difficulty to achieve the forging.

SUMMARY OF THE INVENTION

An object of the present invention is to provide a wheel support bearing assembly, in which separation of the inner ring during assemblage onto an automotive vehicle is prevented without affecting bearing functions, in which deformation of the hub unit under load is suppressed, and in which an occurrence of inner ring creep is prevented.

To this end, the present invention provides a wheel support bearing assembly, which includes an outer member having an inner periphery formed with double row raceway surfaces, an inner member having an outer periphery formed with raceway surfaces opposed to those raceway surfaces of the respective rows, and double row balls interposed between those opposed raceway surfaces. The inner member is made up of a hub unit, which has a wheel mounting flange defined in an outer periphery of an outboard end thereof and also has a center bore defined in a center portion thereof, and an inner ring mounted on an inner ring mounting area, which is defined in the outer periphery of the inboard end of the hub unit and is so configured as to represent an annular recess. The raceway surfaces of the respective rows are formed in the hub unit and the inner ring. A shoulder is defined to indent in an inner peripheral edge of an inboard end face of the inner ring. A crimped portion, engageable with a stepped face of the shoulder in the inner ring, is provided in the inboard end of the hub unit by diameter expansion. The crimped portion of the hub unit is formed by crimping such diameter expanded portion which is thin walled by providing a hub inner diameter setback in the inboard end of the hub unit, and this thin walled portion as a whole is positioned on a side inboardly of the straight line defining a ball contact angle in the inboard raceway surface.

Since the wheel support bearing assembly of the present invention is so designed that the shoulder is provided in the inner peripheral surface of the inner ring and the crimped portion formed by the use of a process of crimping a portion of the hub unit is engaged within the shoulder referred to above, an undesirable separation of the inner ring from the hub unit can be avoided, which separation may otherwise occur under the influence of an external force that may be generated during assemblage onto the automotive vehicle. Since the shoulder is formed in a very limited region of the inner peripheral edge of the inner ring, the mounting length, over which the inner ring is mounted on the hub unit, can be increased, and as a result, it is possible to suppress any reduction in bearing lifetime while occurrence of the inner ring creep is prevented. Also, since reduction of the surface area of the inner ring end face can be minimized despite of the provision of the shoulder, an undesirable increase of the surface pressure of contact with the stepped face of the constant velocity universal joint outer ring can be suppressed, resulting in prevention of generation of frictional wear and noise.

Since the inner ring shoulder is a small component part, it is possible to allow the crimped portion of the hub unit, which is crimped to engage the inner ring shoulder, to be formed by crimping such diameter expanded portion of the hub unit, which is thin walled by the provision of the hub inner diameter setback in the inner periphery of the inboard end of the hub unit. In this way, without relying on the orbital forging, plastic deformation can be accomplished by the use of a relatively easy method through a press work. Since the thin walled portion referred to above, which eventually forms the crimped portion, is positioned in its entirety on one side inwardly of the straight line defining the ball contact angle in the inboard raceway surface, deformation of the hub axle of the hub unit, which would occur under a loaded condition, can be suppressed. Suppression of the deformation of the hub axle is also effective to prevent the inner ring creep.

In the present invention, the raceway surface in the hub unit may be hardened by hardening treatment to provide a hardened surface and the thin walled portion may be a non-hardened portion. The inner ring is hardened in its entirety from surface thereof deep into core thereof by means of a hardening treatment.

When the raceway surface of the hub unit is rendered to be a hardened surface by means of the hardening treatment, the rolling lifetime can be effectively secured. When the thin walled portion is rendered to be a non-hardened portion, the crimping of the thin walled portion can be performed easily. Also, when the inner ring is hardened in its entirety from surface thereof deep into core thereof by means of the hardening treatment, the inner ring can have an excellent rolling lifetime and the mounting surface excellent in resistance to frictional wear against the hub unit.

In the present invention, the shoulder in the inner ring preferably has an axial length within the range of 0.25 to 6 mm. By so doing, it is possible to sufficiently increase the axial length of the inner diametric surface, which defines the mounting surface for the inner ring to be mounted on the hub, to thereby effectively prevent generation of the inner ring creep.

In the present invention, the shoulder in the inner ring preferably has a radial depth within the range of 0.25 to 2.5 mm. This is particularly advantageous in that since the surface area of the inboard end face of the inner ring increases sufficiently, an undesirable increase of the surface pressure of contact with the stepped face of the constant velocity universal joint can be suppressed when the constant velocity universal joint is coupled with the hub unit, and, accordingly, generation of frictional wear and/or noise between the end face referred to above and the stepped face can be prevented effectively.

Also, in the present invention, the crimped portion of the hub unit may have an outer diametric surface held in contact with or in non-contact with a straight portion of the shoulder in the inner ring, which has a maximum diameter and is a cylindrical surface.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

BEST MODE FOR CARRYING OUT THE INVENTION

Figure 1:
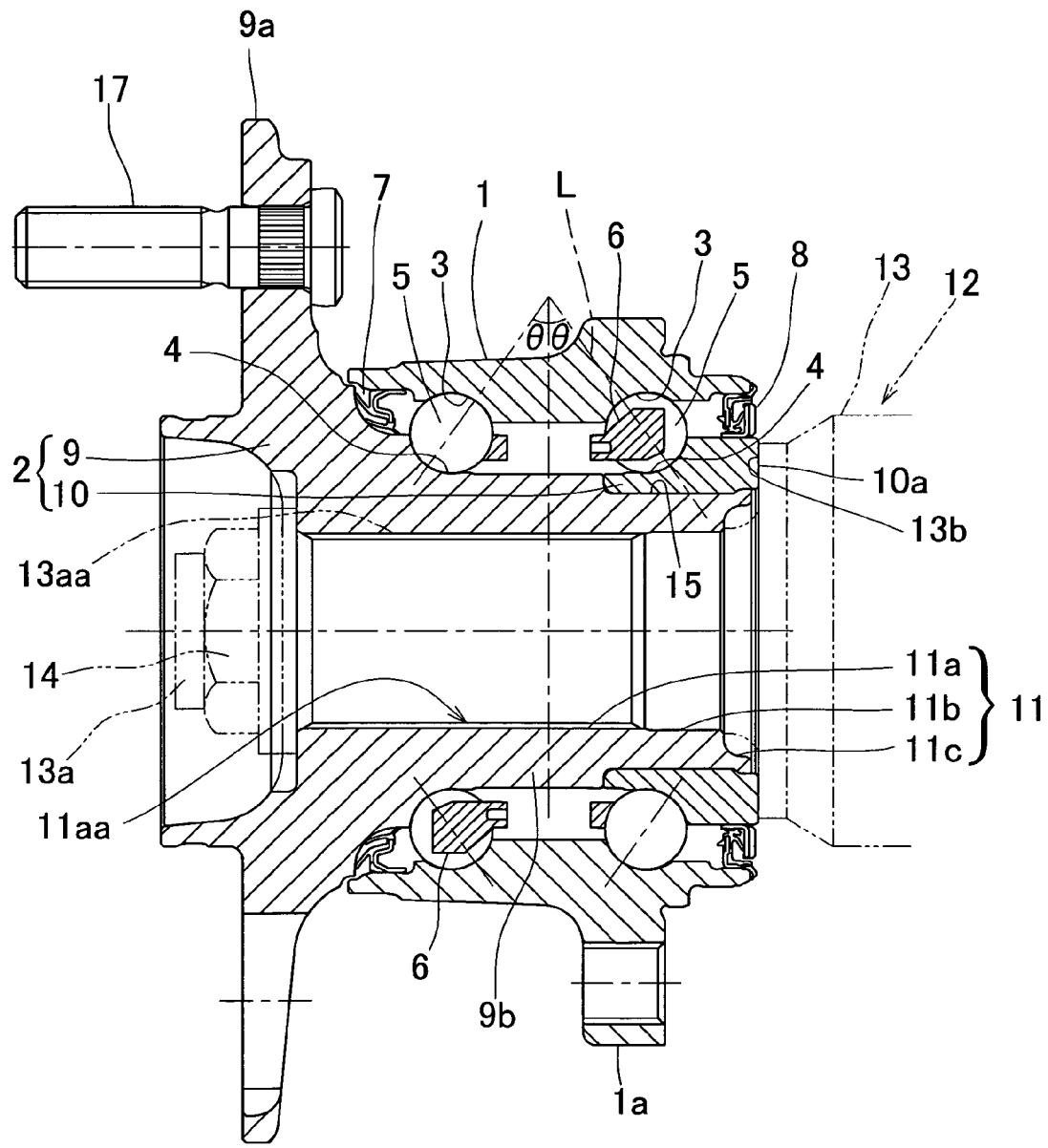
FIG. 1 is a longitudinal sectional view of a wheel support bearing assembly according to a preferred embodiment of the present invention.

A preferred embodiment of the present invention will be described in detail with particular reference to FIGS. 1 and 2. The illustrated embodiment is applied to a wheel support bearing assembly for supporting a vehicle drive wheel, which is an inner race rotating model of a third generation type. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

The illustrated wheel support bearing assembly includes an outer member 1 having an inner periphery formed with double row raceway surfaces 3, an inner member 2 formed with raceway surfaces 4 opposed to those respective raceway surfaces 3, and double row balls 5 as rolling elements interposed between the raceway surfaces 3 and 4. This wheel support bearing assembly is rendered to be a double row, outwardly oriented angular ball bearing type and the balls 5 are retained by a retainer 6 employed for each row. The rolling surfaces 3 and 4 have an arcuately sectioned shape and the rolling surfaces 3 and 4 are so formed as to have respective contact angles oriented outwardly relative to each other, so-called back-to-back relation. Opposite annular open ends of a bearing space delimited between the outer member 1 and the inner member 2 are sealed by respective sealing devices 7 and 8.

The outer member 1 is the one that serves as a stationary member and is of one-piece construction in its entirety including a flange 1*a* formed in an outer periphery thereof and adapted to be secured to a knuckle extending from a vehicle suspension system (not shown).

The inner member 2 is the one that serves as a rotatable member and is made up of a hub unit 9 and an inner ring 10 mounted on an outer periphery of an inboard end of the hub unit 9. The hub unit 9 includes a tubular hub axle 9*b* and a wheel mounting hub flange 9*a* provided in an outer periphery of an outboard end of this hub axle 9*b*. The inner ring 10 is mounted on the hub axle 9*b*. The double row raceway surfaces 4 are formed in the hub unit 9 and the inner ring 10. The raceway surface 4 in the hub unit 9 is rendered to be a hardened surface by means of a hardening treatment. The inner ring 10 is hardened in its entirety from surface deep into core by means of a hardening treatment.

The hub unit 9 has a center bore 11 defined in a center portion thereof. An inner peripheral surface of the hub unit 9 defining the center bore 11 includes a general diameter portion 11a, which occupies a major portion of the center bore 11 and where splined grooves 11aa are formed; an intermediate diameter portion 11b defined inboardly of the general diameter portion 11a and having a diameter larger than that of the general diameter portion 11a; and a hub inner diameter setback 11c defined inboardly of the intermediate diameter portion 11b and having a diameter greater than that of the intermediate diameter portion 11b.

Figure 2:
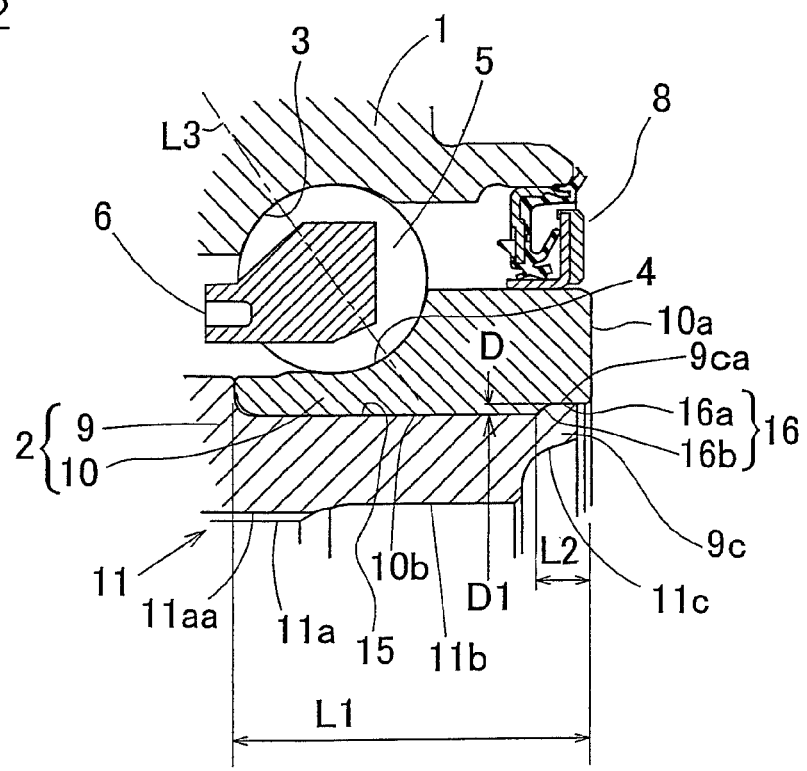
FIG. 2 is a fragmentary longitudinal sectional view, showing a portion of the wheel support bearing assembly on an enlarged scale.
Figure 3:
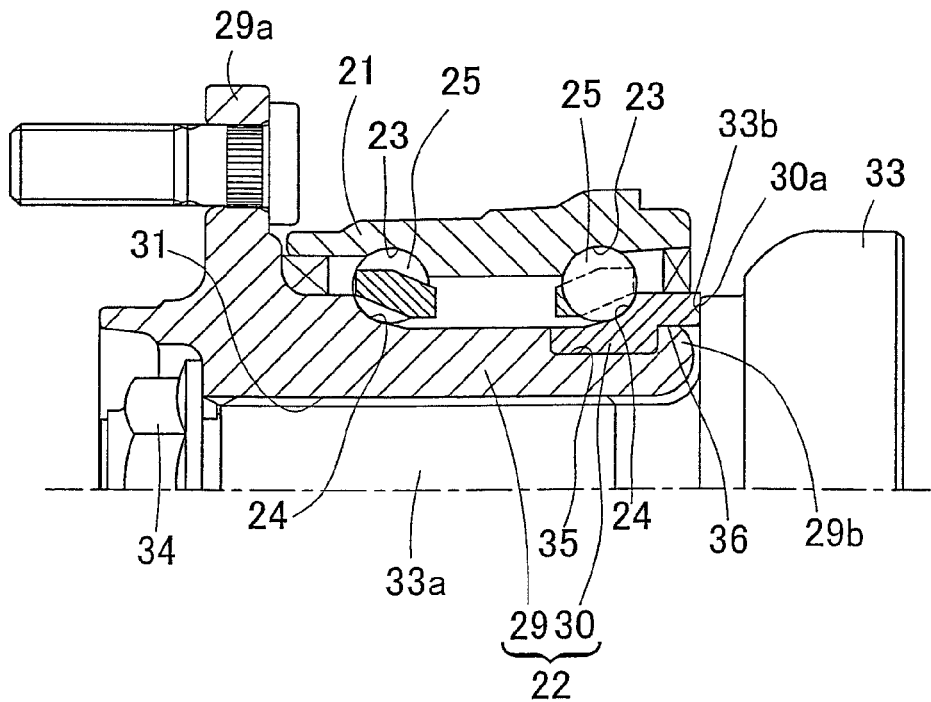
FIG. 3 is a longitudinal sectional view of the conventional example of the wheel support bearing assembly.
Figure 4:
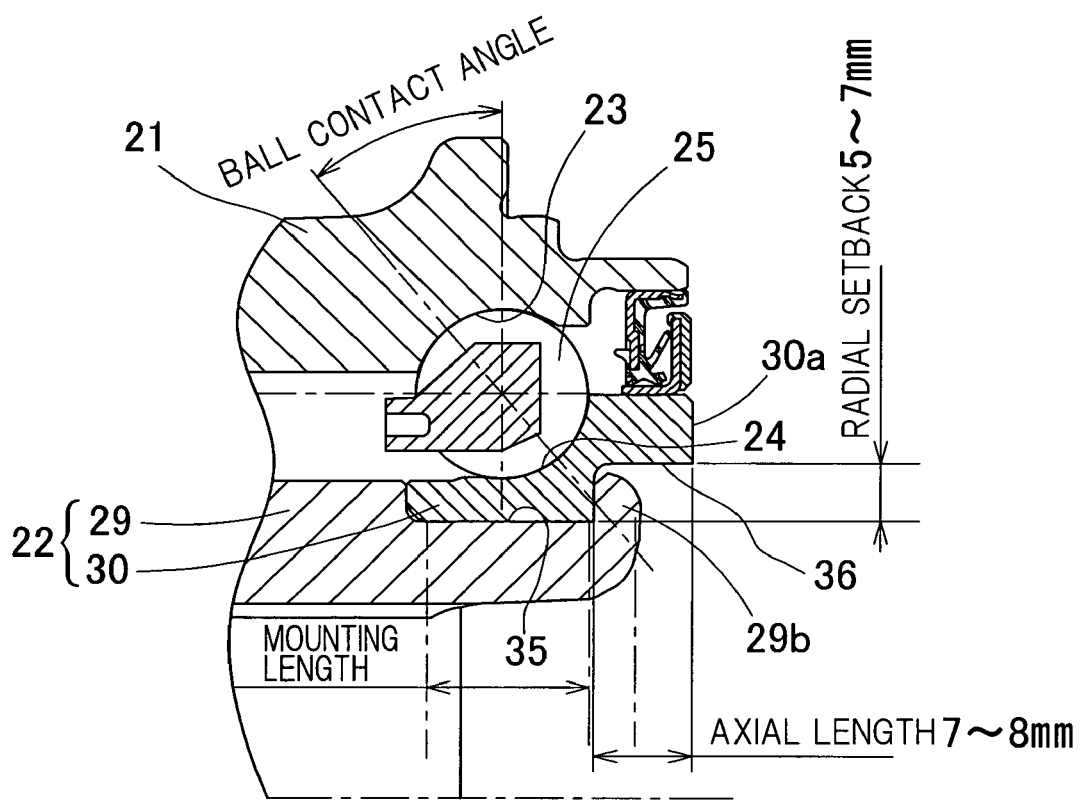
FIG. 4 is a fragmentary longitudinal sectional view, showing a portion of the conventional example.

As shown on an enlarged scale in FIG. 2, the hub unit 9 is formed with an inner ring mounting area 15 defined in an outer periphery of the inboard end thereof so as to represent an annular recess having a diameter smaller than that of the remaining outer peripheral portions of the hub unit 9, and the inner ring 10 has its inner diametric surface 10b mounted on this inner ring mounting area 15. An inner peripheral edge of an inboard end face 10a of the inner ring 10 is provided with a shoulder 16. In other words, an inboard end face of the inner diametric surface 10b is provided with the shoulder 16 having an axial length L2 extending to the inboard end face 10a of this inner ring 10 and also having a radial depth D, that is, a distance between an inner peripheral surface of the shoulder 16 and an inner peripheral surface of the inner ring 10. This shoulder 16 is positioned inboardly of an extended straight line L3 defining the ball contact angle θ of the raceway surface 4 in the inner ring 10. The shoulder 16 has an inner surface so configured as to include a straight surface portion 16a in the form of a cylindrical surface and a stepped surface portion 16b extending radially inwardly from an outboard end edge of the straight surface portion 16a and oriented axially. The straight surface portion 16a is a portion of the shoulder 16 which has a maximum diameter. On the other hand, the stepped surface portion 16b is in the form of an inclined surface having a section along the axial direction which is straight or curved. It is to be noted that the stepped surface portion 16b may be a surface orthogonal to the axial direction.

The inboard end of the hub unit 9 is provided with a crimped portion 9c engaged with the axially oriented stepped surface portion 16b of the shoulder 16 in the inner ring 10 by means of a crimping process. This crimped portion 9c is of a type formed by diameter expansion of the hub inner diameter setback 11c in the center bore 11 and is represented by a thin walled portion of the hub unit 9, which has an inner peripheral surface representing a diameter greater than an inner peripheral surface of the other portion, that is, has a smaller wall thickness, before (not shown) and after crimping is carried out. It is to be noted that an inner peripheral surface portion of the center bore 11 between the hub inner diameter setback 11c and the intermediate diameter portion 11b has a sectional shape representing an arcuate shape.

The crimping process to form the crimped portion 9c is carried out by the use of a crimping punch (not shown) and, as shown in FIG. 2, the crimped portion 9c is crimped in a diameter expanded manner. The inner ring shoulder 16 is so small that the diameter expanding deformation of the crimped portion (thin walled portion) 9c can be accomplished by a relatively easy process by means of a press work. The crimped portion 9c which has been diametrically expanded is engaged with the stepped surface portion 16b of the shoulder 16 to thereby restrain the inner ring 10 from being moved in an inboard direction. The crimped portion 9c may have an outer diametric surface 9ca held either in contact with the straight surface portion 16a of the shoulder 16 or not in contact therewith. Also, the crimped portion 9c is rendered not to project from the end face 10a of the inner ring 10 in the inboard direction.

When the wheel support bearing assembly of the construction described above is to be assembled onto the automotive vehicle, a stem portion 13a of an outer ring 13, which serves as one of coupling members of a constant velocity universal joint 12, is inserted into the center bore 11 of the hub unit 9 with splined projections 13aa in an outer periphery of the stem portion 13a engaged in the corresponding splined grooves 11aa in the inner peripheral surface of the center bore 11, and a nut 14 is then threadingly mounted on a free end of the stem portion 13a to thereby connect the constant velocity universal joint outer ring 13 with the inner member 2. At this time, a stepped face 13b provided in the constant velocity universal joint outer ring 13 so as to orient in the outboard direction is urged against the end face 10a of the inner ring 10, which is oriented in the inboard direction, to thereby constrain the inner member 2 between the constant velocity universal joint outer ring 13 and the nut 14.

The wheel mounting hub flange 9a is positioned on the outboard end of the hub unit 9, and a vehicle wheel (not shown) is fitted to the wheel mounting hub flange 9a through a brake rotor (not shown) by means of hub bolts 17.

According to the wheel support bearing assembly of the structure hereinabove described, since the shoulder 16 is provided in the inner peripheral surface of the inner ring 10 shown in FIG. 2 and the crimped portion 9c formed by the use of a process of crimping a portion of the hub unit 9 is engaged within the shoulder 16, an undesirable separation of the inner ring 10 from the hub unit 9 can be avoided, which separation may otherwise occur under the influence of an external force that may be generated during assemblage onto the automotive vehicle. Since the shoulder 16 is formed in a very limited region of the inner peripheral edge of the inner ring 10, occurrence of the inner ring creep is prevented while a sufficient resistance to separation of the inner ring 10 is secured by increasing the axial length L1-L2 of the inner peripheral surface 10b and as a result, it is possible to suppress any reduction in bearing lifetime. The axial length L2 of the shoulder 16 is within the range of 0.25 to 6 mm and, preferably, within the range of 2 to 5.5 mm. The use of this dimensional range is effective to sufficiently increase the axial length L1-L2 of the inner peripheral surface 10b while the inner ring 10 can be firmly fixed in position by means of the crimping process. Also, the radial depth D of the shoulder 16 is within the range of 0.25 to 2.5 mm and, preferably, within the range of 0.25 to 1.3 mm. The use of this dimensional range is effective to sufficiently increase the surface area of the inboard end face 10a of the inner ring 10 while the inner ring 10 can be firmly fixed in position by means of the crimping process. For those reasons, since reduction of the surface area of the inner ring end face 10a are minimized despite of the provision of the shoulder 16, an undesirable increase of the surface pressure of contact with the stepped face of the constant velocity universal joint outer ring 13 can be suppressed, resulting in prevention of generation of frictional wear and noise between those elements 10a and 13.

Also, since the inner ring shoulder 16 is a small component part, it is possible to allow the crimped portion 9c of the hub unit 9, which is crimped to engage the inner ring shoulder 16, to be formed by crimping such diameter expanded portion of the hub unit 9, which is thin walled by the provision of the hub inner diameter setback 11c in the inner periphery of the inboard end of the hub unit 9. In this way, without relying on the orbital forging, plastic deformation can be accomplished by the use of a relatively easy method through a press work.

Since the thin walled portion referred to above, which eventually forms the crimped portion 9c, is positioned in its entirety on one side inwardly of the straight line L3 defining the ball contact angle θ in the inboard raceway surface 4, deformation of the hub axle 9b of the hub unit 9, which would occur under a loaded condition, can be suppressed. Suppression of the deformation of the hub axle is also effective to prevent the inner ring creep.

In addition, since the inner ring shoulder 16 is positioned on one side inboardly of the straight line L3 referred to above, deformation of the inner ring 10, when loaded, is so small that the lifetime can be increased correspondingly. Also, since the axial length L2 of the shoulder 16 in the inner ring is small, a sufficient length (surface area) of mounting of the inner ring 10 on the hub axle can be secured and, therefore, the bearing lifetime can be increased while the inner ring creep is prevented from occurring.

Since the center bore 11 of the hub unit 9 is of a configuration, in which a portion thereof on the inboard side of the general diameter portion 11a, where the splined grooves 11aa are formed, is of a double stepped shape including the intermediate diameter portion 11b and the hub inner diameter setback 11c, the intermediate diameter portion 11b can serves as a guide during insertion of the stem portion 13a of the constant velocity universal joint outer ring 13, thus facilitating the assemblage.

In the wheel support bearing assembly of the foregoing construction, since the raceway surface 4 of the hub unit 9 is rendered to be a hardened surface by means of the hardening treatment, the rolling lifetime can be effectively secured. Since the thin walled portion 9c is rendered to be a non-hardened portion, the crimping of the thin walled portion 9c can be performed easily. In view of the fact that the inner ring 10 is a small component part and has the raceway surface 4 defined therein and held in contact with the hub unit 9, since the inner ring 10 is hardened in its entirety from surface thereof deep into core thereof by means of the hardening treatment, the inner ring 10 can have an excellent rolling lifetime and the mounting surface excellent in resistance to frictional wear against the hub unit 9.

What is claimed is:

1. A wheel support bearing assembly to be connected with a constant velocity joint, comprising:
    an outer member having an inner periphery formed with double row raceway surfaces;
    an inner member having an outer periphery formed with raceway surfaces opposed to those raceway surfaces of the respective rows; and
    double row balls interposed between those opposed raceway surfaces,
    wherein the inner member is made up of a hub unit, which has a wheel mounting flange defined in an outer periphery of an outboard end thereof and also has a center bore defined in a center portion thereof, and an inner ring mounted on an inner ring mounting area, which is defined in the outer periphery of the inboard end of the hub unit and is so configured as to represent an annular recess,
    the raceway surfaces of the respective rows are formed in the hub unit and the inner ring;
    a shoulder is defined to indent in an inner peripheral edge of an inboard end face of the inner ring,
    a crimped portion, engageable with an axially oriented stepped face of the shoulder in the inner ring, is provided in the inboard end of the hub unit by diameter expansion,
    the crimped portion of the hub unit is formed by crimping such diameter expanded portion which is thin walled by providing a hub inner diameter setback in the inboard end of the hub unit, and this thin walled portion as a whole is positioned on a side inboardly of the straight line defining a ball contact angle in the inboard raceway surface, and
    a stem portion of the constant velocity joint is inserted into the center bore of the hub unit and a stepped face is provided in the constant velocity joint so as to orient in the outboard direction, the stepped face being urged against the inboard end face of the inner ring, to thereby constrain the inner member between the constant velocity joint and a nut threadingly mounted on a free end of the stem portion.

2. The wheel support bearing assembly as claimed in claim 1, wherein the raceway surface in the hub unit is hardened by hardening treatment to provide a hardened surface, and the thin walled portion is a non-hardened portion, the inner ring being hardened in its entirety from surface thereof deep into core thereof by means of a hardening treatment.

3. The wheel support bearing assembly as claimed in claim 1, wherein the shoulder in the inner ring has an axial length within the range of 0.25 to 6 mm.

4. The wheel support bearing assembly as claimed in claim 1, wherein the shoulder in the inner ring has a radial depth within the range of 0.25 to 2.5 mm.

5. The wheel support bearing assembly as claimed in claim 1, wherein the crimped portion of the hub unit has an outer diametric surface held in contact with a straight portion of the shoulder in the inner ring, which has a maximum diameter and is a cylindrical surface.

6. The wheel support bearing assembly as claimed in claim 1, wherein the crimped portion of the hub unit has an outer diametric surface held in non-contact with a straight portion of the shoulder in the inner ring, which has a maximum diameter and is a cylindrical surface.

7. The wheel support bearing assembly as claimed in claim 1, wherein an inner peripheral surface forming the center bore of the hub unit comprises:
    a general diameter portion which occupies a major portion of the center bore;
    an intermediate diameter portion defined inboardly of the general diameter portion and having a diameter larger than that of the general diameter portion; and
    the hub inner diameter setback being defined inboardly of the intermediate diameter portion and having a diameter greater than that of the intermediate diameter portion.

8. The wheel support bearing assembly as claimed in claim 1, wherein the crimped portion is engaged with the stepped face of the shoulder so as to restrain the inner ring from being moved in an inboard direction during assemblage onto a vehicle.

* * * * *

UNITED STATES PATENT AND TRADEMARK OFFICE
CERTIFICATE OF CORRECTION

| | |
|---|---|
| PATENT NO. | : 8,142,081 B2 |
| APPLICATION NO. | : 12/309973 |
| DATED | : March 27, 2012 |
| INVENTOR(S) | : Akira Fujimura et al. |

It is certified that error appears in the above-identified patent and that said Letters Patent is hereby corrected as shown below:

IN THE CLAIMS:

Column 7, Line 60, In Claim 1, delete "ring;" and insert -- ring, --, therefor.

Signed and Sealed this
Fourth Day of September, 2012

David J. Kappos
*Director of the United States Patent and Trademark Office*